March 1, 1966 G. J. MARTIN 3,237,531
FLUID SYSTEM AND VALVE ASSEMBLY THEREFOR
Filed Nov. 12, 1964 3 Sheets-Sheet 3

INVENTOR
GEORGE J. MARTIN

BY
Oberlin, Maky & Donnelly
ATTORNEYS

United States Patent Office 3,237,531
Patented Mar. 1, 1966

3,237,531
FLUID SYSTEM AND VALVE ASSEMBLY
THEREFOR
George J. Martin, Lyndhurst, Ohio, assignor to Parker-Hannifin Corporation, Cleveland, Ohio, a corporation of Ohio
Filed Nov. 12, 1964, Ser. No. 410,685
20 Claims. (Cl. 91—414)

The present invention relates generally as indicated to a fluid system and valve assembly therefor and more particularly to a system having a valve assembly therein for effective control of fluid motors.

It is a principal object of this invention to provide a valve assembly of the character indicated which embodies a flow control valve disposed in the return port of the valve housing in such manner that bypass flow therethrough from the inlet port 7 to the return port is not impeded in any manner but that return flow from a motor to the return port (bypass closed) is substantially discontinued or throttled, in the event of substantial drop in pressure in the inlet port of the housing as would be caused, for example, by a fluid motor being pressure actuated in the same direction as the applied load thereon, such return flow being instead diverted to the inlet port to thus prevent pump cavitation.

It is another object of this invention to provide a novel overload or shock relief valve arrangement in a directional control valve housing for relieving pressure shock as caused, for example, by shifting the directional control valve from motor operating position to neutral position, whereby the inertia of the load on the motor builds up a high pressure in the system between the motor and the directional control valve.

It is another object of this invention to provide a dual overload relief arrangement in a directional control valve wherein the motor ports of said valve are communicated with each other in case of high pressure buildup when the load on the motor controlled by said valve is stopped by actuation of the directional control valve from motor operating position to neutral position, thus relieving pressure shock loads in the system and preventing cavitation in the system between the motor and directional control valve.

It is another object of this invention to provide a novel overload relief and load check valve arrangement wherein the relief valve prevents overload of the system and the load check valve prevents back flow of fluid from one motor to another when said motors are operated simultaneously by their respective directional control valves.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Figure 1:
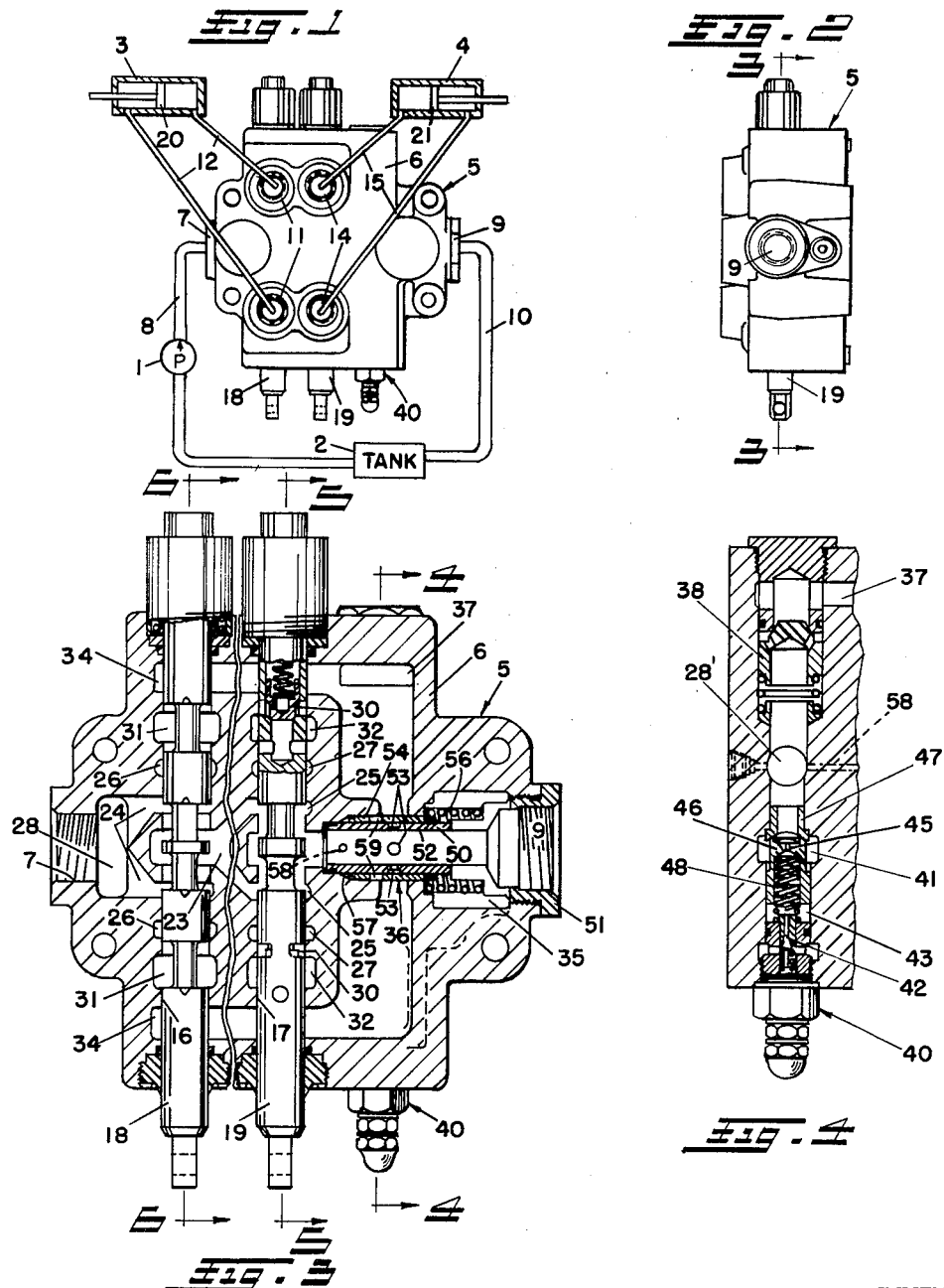
FIG. 1 is a front elevation view of a valve assembly embodying the present invention, said valve assembly being shown in association with a pump, a reservoir, and a pair of fluid motors.
Figure 3:
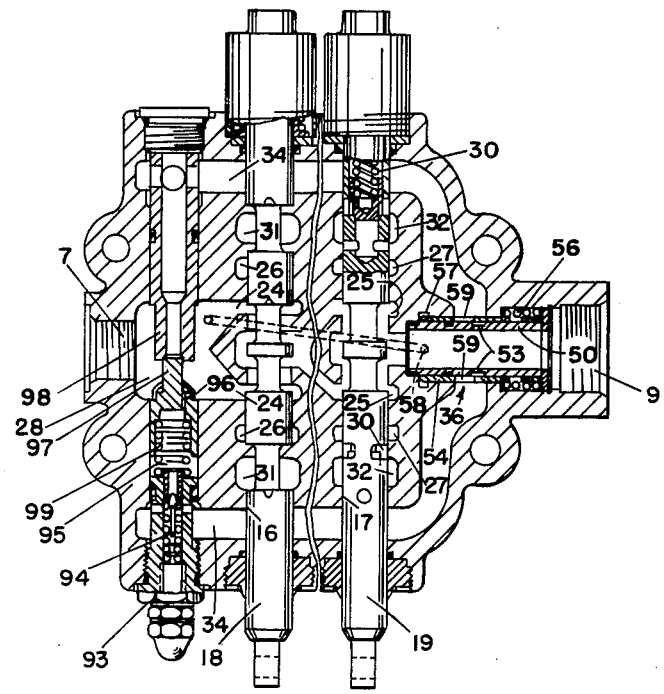
FIG. 3 is a cross-section view on enlarged scale, taken substantially along the line 3—3, FIG. 2.

FIGS. 4, 5 and 6 are cross-section views on enlarged scale taken substantially along the lines 4—4, 5—5 and 6—6, FIG. 1;

FIG. 7 is a cross-section view similar to FIG. 5, except illustrating a modified form of load check valve arrangement in connection with a solid valve spool;

FIG. 8 is a cross-section view also similar to FIG. 5 except illustrating a modification for converting the valve assembly of FIG. 3 from parallel operation to series-parallel operation; and FIG. 9 is a cross-section view similar to FIG. 3, except that the main relief valve for the system also operates as a check valve in association with a flow control valve effective to prevent pump cavitation.

Figure 2:
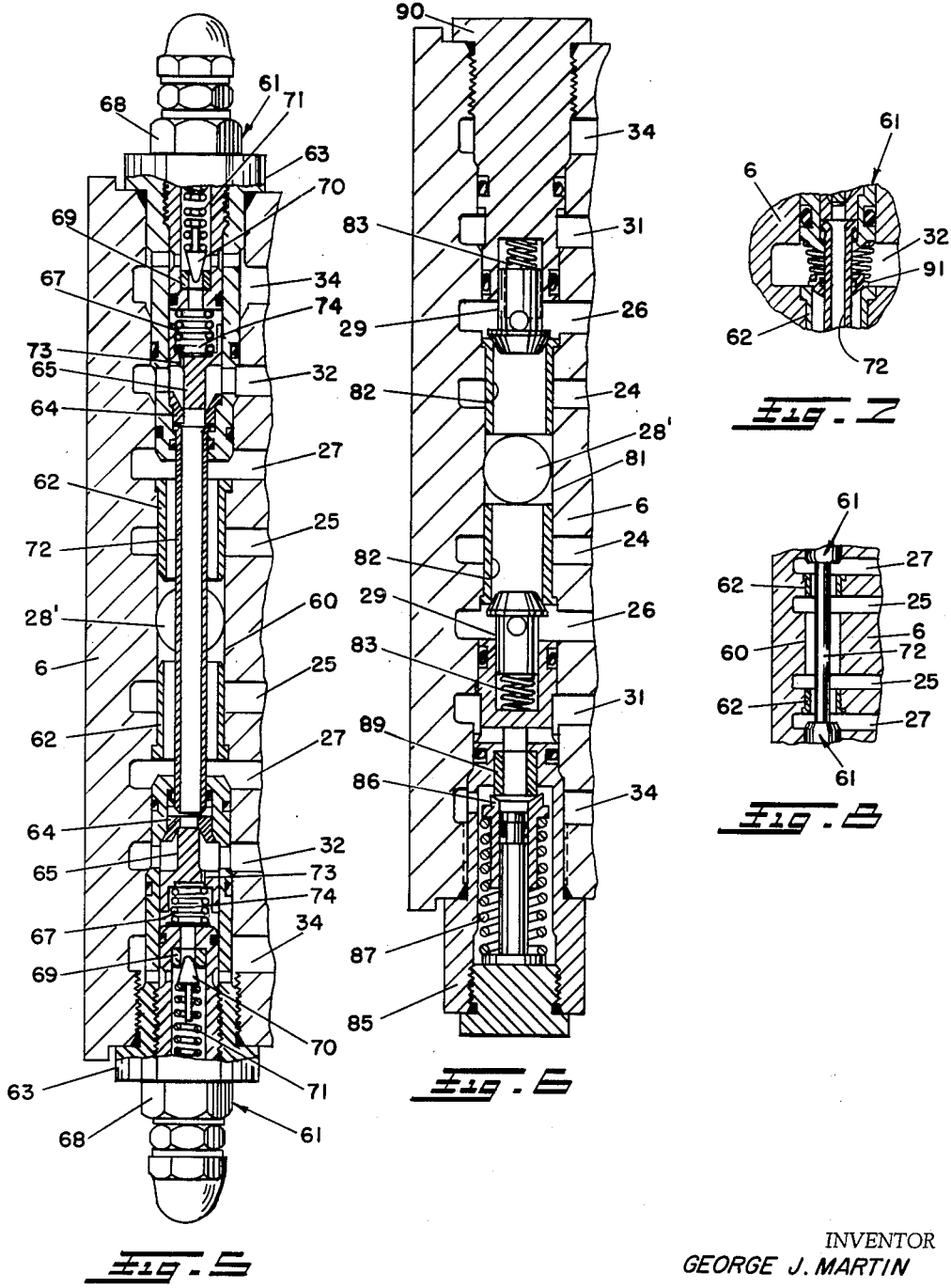
FIG. 2 is an end elevation view of the valve assembly as viewed from the right-hand side of FIG. 1.

Referring now more particularly to the drawings, and first to FIGS. 1, 2 and 3, the fluid system herein shown comprises a pump 1, a fluid reservoir 2, a pair of fluid motors 3;4 and a directional control valve assembly 5. Said assembly 5 comprises a housing 6 having an inlet port 7 connected to the pump delivery conduit 8, a return port 9 connected by conduit 10 to the reservoir 2, a pair of service ports 11;11 connected by conduits 12;12 with the ends of the fluid motor 3, and a pair of service ports 14;14 connected by conduits 15;15 with the ends of the fluid motor 4.

The housing 6 is formed with bores 16;17 in which the respective valve spools 18;19 are reciprocable to control the respective fluid motors 3;4. When both spools 18 and 19 are in neutral position, as shown, both motor pistons 20 and 21 are locked against movement in either direction and the fluid discharged by the pump 1 is bypassed to the reservoir 2 via the bypass passage 23 which intersects the respective bores 16 and 17.

Straddling the bypass branches 24;24 and 25;25 which intersect the respective bores 16 and 17 are pressure feed passages 26;26, and 27;27, of which the feed passages 26;26 communicate with the inlet chamber 28 and inlet trunk passage 28' through check valves 29 (see FIG. 6) associated with the spool 18 which, as well known in the art, are so-called load check valves to prevent reverse flow of fluid from one motor circuit to another when both are operated simultaneously, as in the case where one motor is operating under greater load than the other motor. In the case of the spool 19, it is of hollow construction and the load check valves 30 (see FIG. 3) are contained in the spool, but these check valves 30 perform the same function as the aforesaid check valves 29 in permitting flow in only one direction from a pressure feed passage 27 to an adjacent motor passage 32. Straddling the respective pressure feed passages 26;26, and 27;27 are motor passages 31;31 and 32;32 leading respectively to motor ports 11;11, and 14;14, and straddling the respective motor passages 31;31 and 32;32 and intersecting both bores 16 and 17 are return passages 34;34 which, in a conventional form of directional control valve assembly, would communicate directly with the return chamber 35.

However, in the present case, said return passages 34;34 communicate with the return chamber 35 through a flow control valve 36 as shown in FIG. 3. The return passages 34;34 also communicate with the inlet chamber 28 via a passage 37, a check valve 38, and inlet trunk passage 28' as best shown in FIGS. 3 and 4 so that fluid may flow from the return passages 34;34 into the inlet chamber 28 whenever the pressure in the return passages 34;34 exceeds the pressure in the inlet chamber 28.

FIG. 4 also discloses the main relief valve 40 for the system which, when the pressure in the inlet chamber 28 and inlet trunk passage 28' exceeds a predetermined pressure, opens to communicate the passage 28' with a passage 41 leading to the return chamber 35. The main relief valve 40 is of the pilot operated type which, when the pilot valve member 42 is unseated by pressure in the chamber 43, vents the chamber 43 faster than pressure can build up therein through the orifice 45 in the main relief valve member 46, whereby the predominating pressure acting on the main valve member 46 moves it away from its seat 47 against the main valve spring 48 to relieve excess pressure.

Referring now in detail to the flow control valve 36, the same comprises a sleeve 50 held in the housing 6 by the return port adapter 51, the bore 52 through the sleeve 50 constituting an extension of the bypass passage 23 for free flow of fluid when both spools 18;19 are in neutral position. Through the wall of said sleeve 50 are openings 53 which are opened and closed by the sleeve valve member 54 which is biased by the spring 56 to the position shown closing communication between the return passages 34;34 and the return chamber 35 when the spools 18;19 are in neutral position. Said sleeve valve member 54 defines with the housing 6 and with the sleeve 50 a chamber 57 to which leads a passage 58 from the inlet trunk passage 28', and as evident, when one or both spools are operated, pressure in the inlet chamber 28 and in the flow control valve chamber 57 will cause the sleeve valve member 54 to be moved against the spring 56 toward the right to permit free return flow of fluid from the fluid motor 3 or 4 or motors 3;4, through the registering passages 59 and 53 of the sleeve valve member 54 and the sleeve 50 to the return chamber 35. However, in the event that the load on a motor 3 or 4 acts in the same direction as the fluid pressure, the motor may demand fluid at a rate exceeding the capacity of the pump 1, and when that occurs, the pressure in the inlet chamber 28 will decrease to such an extent that the pressure in the chamber 57 will decrease sufficiently so that the spring 56 will urge the sleeve valve member 54 to the position shown in FIG. 3, thus blocking return flow from the motor 3 or 4 with consequent build-up of pressure in the return passages 34;34 so as to exceed the pressure in the inlet chamber 28 whereupon the check valve 38 opens so that all of the return flow supplements the pump capacity to prevent pump cavitation and to build up pump pressure.

Referring now more particularly to FIGS. 3 and 5, the spool 19 is of the four-way type and disposed within the ends thereof are the check valves 30;30 which open when adjacent feed and motor passages 27 and 32 are communicated with each other, and thus said check valves 30;30 constitute load check valves as aforesaid to prevent back flow of fluid as when both motors 3 and 4 are simultaneously actuated and the load on the motor 3 is less than the load on the motor 4 controlled by said spool 19.

Parallel to the spool bore 17, the housing 6 is formed with a bore 60 which is intersected by the inlet trunk passage 28' from the inlet chamber 28. The bypass passage branches 25;25, the pressure feed passages 27;27, the motor passages 32;32 and the return passages 34;34 likewise intersect said bore 60. Disposed in said bore 60 are duplicate pilot-operated relief valves 61. Said relief valves 61 are so arranged that the motor passages 32;32 are intercommunicated with each other when, for example, the spool 19 is shifted from either of its operating positions to neutral position to block flow of fluid from and to the motor 4 and consequent build up and reduction of pressures in the respective motor passages 32;32 due to the inertia of the load on the motor 4 when stopped by such shifting of spool 19. In this way shock pressure is limited and cavitation is prevented between the motor 4 and the spool 19.

Fitted into said bore 60 are a pair of sleeves 62 which, in this case, close communication between the bypass passage branches 25 and the trunk passage 28' and feed passages 27;27. Screwed into each end of said bore 60 is a tubular main relief valve body 63 having a seat 64 therein for the main relief valve member 65 which is biased against said seat 64 by the spring 67. Screwed into said main relief valve body member 63 is a pilot relief body member 68 which contains a seat 69 for the pilot relief valve member 70 which is biased against said seat 69 by the spring 71.

Extending between said relief valve assemblies 61 and sealed in the inner ends of the bodies 63 is a tube 72 through which the motor passages 32;32 are placed in communication with each other when the main relief valve members 65 are unseated.

Assuming that the operation of the spool 19 from operating position to neutral position causes a high pressure shock load due to inertia to build up in the lower motor passage 32, such high pressure acting on the lower pilot relief valve member 70 through the orifice 73 in the lower main relief valve member 65 will unseat said lower pilot relief valve member 70 so that pressure will drop in the lower chamber 74 so that the predominant pressure will then urge the lower main relief valve member 65 out of engagement with its seat 64 overcoming the bias of the spring 67. Such relieved pressure then flows through the tube 72 and acts on the lower end of the upper main relief valve member 65 to urge it away from its seat 64, whereby cavitation in the upper motor passage 32 is prevented. In that case, the upper main relief valve member 65 operates as a check valve when it opens because the pressure in the tube 72 acts on the seat area and overcomes the relatively weak bias of the upper spring 67. Obviously, when the shock is in the upper motor passage 32 and the tendency to cavitate is in the lower motor passage 32, the above-described operation of the aforesaid relief valve assemblies 61 is reversed.

Referring now to FIGS. 3 and 6, the four-way spool 18 is of solid construction and the load check valves 29 together with an overload relief valve assembly 85, are disposed in a bore 81 in the housing 6 parallel to the spool bore 16. Here again, as in FIG. 5, the bore is intersected by the inlet trunk passage 28' from the inlet chamber 28, by the bypass passage branches 24;24, the pressure feed passages 26;26, the motor passages 31;31 and the return passages 34;34. As in FIG. 5, the FIG. 6 embodiment has sleeves 82 fitted in the bore 81 closing the bypass passage branches 24;24, and seated against said sleeves 82 are the check valves 29 biased by springs 83 to seated positions, as shown. Thus, when the spool 18 is moved from neutral position to either operating position, fluid under pressure in the inlet chamber 28 and trunk passage 28' will unseat one check valve 29 for flow of fluid from one feed passage 26 to the adjacent motor passage 31. The other motor passage 31 will be communicated with the adjacent return passage 34 for flow through the flow control valve 36 to the return port 9.

In FIG. 6 either or both ends of the bore 81 may have installed therein an overload relief valve assembly 85. In the present example the overload relief valve assembly 85 is associated with the lower motor passage 31 and when the spool 18 is shifted from an operating position communicating the lower motor passage 31 with the adjacent return passage 34 to neutral position, the inertia of a load on the motor 3 will cause a build up of fluid pressure in the fluid trapped between the motor 3 and the spool 18. Excess pressure built up will be released to the return passage 34 by movement of the relief valve member 86 against the biasing spring 87 away from the seat 89. Obviously, if the installation is such that the shock load may occur in the upper motor passage 31, an identical overload relief valve assembly 85 may be installed in the upper end of the bore 80 replacing the plug member 90.

Instead of having load check valves 30 disposed inside the spool as shown in FIG. 3, or load check valves 29 arranged in a bore 81 alongside and parallel to the spool bore 16 as show in FIG. 6, load check valves may instead be built into the bore 60 containing the tube 72 and the relief valve assemblies 61 of FIG. 5. Since in FIG. 5 the flow of high pressure fluid is from the trunk passage 28' to one or the other of the pressure feed passages 27 through the annular space between the sleeves 62 and the tube 72, there is shown in FIG. 7 check valves 91 disposed around the tube 72 and seated against the ends of the sleeves 62 and in that case, the check valves 91 would function in the same manner as the check valves 29 shown in FIG. 6, whereupon a solid spool 18 may be substituted for the spool 19.

Referring to FIG. 8, if the high pressure inlet trunk passage 28′ does not extend to the bore 60 and if one or both of the sleeves 62 are shortened as in FIG. 8 (or omitted) the circuity is converted to one in which the downstream spool 19 can be operated only when the upstream spool 18 is in neutral position, and thus only one motor 3 or 4 at a time may be operated. As apparent, when the upstream spool 18 is shifted to operating position there is no high pressure feed to the bypass passage branches 25 and thus high pressure cannot enter the bore 60. The only time that high pressure can enter the bore 60 through either or both of the bypass passage branches 25 is when the upstream spool 18 is in neutral position. In the arrangement shown in FIGS. 3, 5 and 6, the spools 18 and 19 may be operated separately or simultaneously since the high pressure feed through trunk passage 28′ can reach the pressure feed passages 26;26 and 27;27.

FIG. 9 is substantially the same as FIGS. 3, 5 and 6, except that the pilot-operated main relief valve 93 is constructed to operate not only as a high pressure relief valve but also as a check valve in association with the flow control valve 36 effective to prevent pump caviation. As apparent, if the pressure in the inlet chamber 28 exceeds a predetermined value sufficient to open the pilot relief valve member 94, the pressure drop in the chamber 95 through the main relief valve member orifice 96 will cause movement of the main relief valve member 97 away from its seat 98 to relieve excess pressure through the seat and through the upper return passage 34 and through the now open flow control valve 36 to the return port 9, such high pressure in the inlet chamber 28 and chamber 57 being effective to shift the flow control valve member 54 to the right against the spring 56 to open the return passage 34 to the return port 9. However, if the pressure in the chambers 28 and 57 drops due to demand of a fluid motor 3 and/or 4 exceeding the pump capacity, the flow control valve 36 will close the return passage 34 as previously explained, and the build up of pressure in the return passage 34 exceeding that in the inlet chamber 28 will force the relief valve member 97 away from its seat 98 so that all of the return flow of fluid from such motor or motors will be conducted back into the inlet chamber 28 to prevent pump cavitation. When the main relief valve member 97 thus functions as a check valve, the return pressure in passage 34 acts on the area of the seat 98 and forces the main relief valve member 97 away from the seat 98 against the relatively weak biasing spring 99.

Other modes of applying the principle of the invention may be employed, change being made as regards the details described, provided the features stated in any of the following claims, or the equivalent of such, be employed.

I therefore particularly point out and distinctly claim as my invention:

1. In a fluid system of the type including a directional control valve operatively interposed between a pump, a double acting fluid motor, and a reservoir to control flow of fluid to said motor from said pump and to said reservoir from said motor; the improvement which comprises a directional control valve housing having an inlet port, a pair of motor ports, and a return port connected respectively to said pump, fluid motor, and reservoir, and having a directional control valve member movable in said housing between a neutral position blocking fluid communication between said inlet port and both motor ports and between said return port and both motor ports and operating positions selectively communicating said motor parts with said inlet and return ports, said housing having a bypass passage therethrough which is open when said directional control valve member is in neutral position for flow of fluid from said inlet port to said return port, said bypass passage being closed by movement of said directional control valve member to either operating position; and a flow control valve in said housing including a tubular member in said return port constituting a portion of said bypass passage for flow of fluid therethrough when said valve member is in neutral position, and a flow control valve member actuated by fluid pressure in said inlet port to establish return flow to said return port from the motor port then in communication therewith when said directional control valve member is in an operating position closing said bypass passage.

2. The system of claim 1 wherein spring means biases said flow control valve member to a position closing such return flow except when the fluid pressure in said inlet port exceeds a predetermined value to overcome the force exerted by said spring means.

3. The system of claim 1 wherein check valve means in said housing opens such return flow into said inlet port whenever the fluid pressure thereof exceeds that in said inlet port.

4. In a fluid system of the type including a directional control valve operatively interposed between a pump, a double acting fluid motor, and a reservoir to control flow of fluid to said motor from said pump and to said reservoir from said motor; the improvement which comprises a directional control valve housing having an inlet port, a pair of motor ports, and a return port connected respectively to said pump, fluid motor and reservoir, and having a valve member movable in said housing between a neutral position blocking fluid communication between said inlet port and both motor ports and between said return port and both motor ports to operating positions selectively communicating said motor ports with said inlet and return ports, said housing having a bypass passage therethrough which is open when said valve member is in neutral position for flow of fluid from said inlet port to said return port, said bypass passage being closed by movement of said valve member to either operating position; and relief-check valve means in said housing operative, upon movement of said valve member from an operating position to neutral position, to relieve through said relief valve means excess pressure in one motor port for flow through said check valve means into the other motor port due to the inertia of the arresting of the movement of a load on said fluid motor.

5. The system of claim 4 wherein duplicate relief-check valve means are provided to relieve excess pressure in the other motor port for flow into said one motor port.

6. The system of claim 5 wherein each duplicate relief-check means comprises a valve member having one portion exposed to fluid pressure in the associated motor port to move it as a relief valve member and having another portion exposed to fluid pressure in the other motor port to move it as a check valve member.

7. In a fluid system of the type including a directional control valve operatively interposed between a pump, a double acting fluid motor, and a reservoir to control flow of fluid to said motor from said pump and to said reservoir from said motor; the improvement which comprises a directional control valve housing having an inlet port, a pair of motor ports, and a return port connected respectively to said pump, fluid motor, and reservoir, and having a valve member movable in said housing between a neutral position blocking fluid communication between said inlet port and both motor ports and between said return port and both motor ports to operating positions selectively communicating said motor ports with said inlet port and said return port; said housing having a bypass passage therethrough which is open when said valve member is in neutral position for flow of fluid from said inlet port to said return port, said bypass passage being closed by movement of said valve member to either operating position; and relief-check valve means operative to relieve fluid pressure in said inlet port exceeding a predetermined value into said return port and to permit flow of fluid from said return port into said inlet port in the event of fluid pressure in said return port exceeding that in said inlet port.

8. The system of claim 7 wherein said relief-check valve means comprises a valve having one portion exposed to fluid pressure in said inlet port to move it as a relief valve member for flow of fluid into said return port, and having another portion exposed to fluid pressure in said return port to move it as a check valve member for flow of fluid into said inlet port.

9. The system of claim 7 wherein said housing has a flow control valve therein including a tubular member in said return port constituting a portion of said bypass passage for flow of fluid therethrough when said valve member is in neutral position, and a flow control valve member actuated by fluid pressure in said inlet port to establish return flow to said return port from the motor port then in communication therewith when said directional control valve member is in an operating position closing said bypass passage.

10. A multi-spool directional control valve for controlling actuation of a corresponding number of fluid motors comprising a housing having an inlet port for connection with a fluid pressure source, a return port for connection with a fluid reservoir, and motor ports for connection with the respective fluid motors; said housing having at least two bores intersected axially therealong by a bypass passage from said inlet port to said return port, by pressure feed passages communicating with said inlet port via an inlet trunk passage and cross bores in said housing, by motor passages communicating with the respective motor ports, and by return passages communicating with said return port; valve spools reciprocable in the respective bores from a neutral position whereat said bypass passage is open for flow of fluid from said inlet port to said return port and communication between said motor passages with said pressure feed passages and return passages is blocked to at least two operating positions whereat said motor passages are selectively communicated with said pressure feed passages or said return passages for actuation of the respective fluid motors, said spools being operative to close said bypass passage upon movement thereof to an operating position for build-up of fluid pressure in said inlet port, inlet trunk passage, and cross bores to supply fluid under pressure to any motor passage, then in communication with its associated pressure feed passage; a flow control valve in said housing including a tubular member in said return port constituting a portion of said bypass passage, and a valve member actuated by fluid pressure in said inlet port to establish return flow from any motor passage then in communication with its return passage to said return port when either spool is in an operating position closing said bypass passage; said housing having another cross bore intersecting said inlet trunk passage and communicating with said return passages; and check valve means in said last-mentioned another cross bore permitting fluid flow from said return passages into said inlet trunk passage via said check valve means when fluid pressure in said retun passages exceeds that in said inlet port as occasioned, for example, by fluid demand of a motor exceeding the capacity of the pressure source.

11. A multi-spool directional control valve for controlling actuation of a corresponding number of fluid motors comprising a housing having an inlet port for connection with a fluid pressure source, a return port for connection with a fluid reservoir, and motor ports for connection with the respective fluid motors; said housing having at least two bores intersected axially therealong by a bypass passage from said inlet port to said return port, by pressure feed passages communicating with said inlet port via an inlet trunk passage and cross bores in said housing, by motor passages communicating with the respective motor ports, and by return passages communicating with said return port; valve spools reciprocable in the respective bores from a neutral position whereat said bypass passage is open for flow of fluid from said inlet port to said return port and communication between said motor passages with said pressure feed passages and return passages is blocked to at least two operating positions whereat said motor passages are selectively communicated with said pressure feed passages or said return passages for actuation of the respective fluid motors, said spools being operative to close said bypass passage upon movement thereof to an operating position for build-up of fluid pressure in said inlet port, inlet trunk passage, and cross bores to supply fluid under pressure to any motor passage then in communication with its associated pressure feed passage; relief-check valve means in at least one of said cross bores which, in conjunction with a four-way spool, is operative to relieve excess fluid pressure in one motor passage through said relief valve means for flow through said check valve means to the other motor passage as occasioned by the inertia of a load on the associated double acting fluid motor when said four-way spool is shifted from operating position to neutral position.

12. The valve of claim 11 wherein said one cross bore has another relief-check valve means therein operative to relieve excess fluid pressure in said other motor passage through said another relief valve means for flow through said another check valve means to said one motor passage.

13. The valve of claim 12 wherein first and second valve members alternately constitute said relief valve and check valve means and said another check valve and relief valve means.

14. The valve of claim 13 wherein a tubular member extends through said cross bore in spaced relation thereto between said first and second valve members.

15. The valve of claim 14 wherein load check valve means between said cross bore and said tubular member permits flow in one direction only from said feed passage to a motor passage then in communication therewith.

16. The valve of claim 14 wherein said four-way spool is hollow and has a load check valve therein to permit flow in one direction only from said feed passage to a motor passage then in communication therewith.

17. A multi-spool directional control valve for controlling actuation of a corresponding number of fluid motors comprising a housing having an inlet port for connection with a fluid pressure source, a return port for connection with a fluid reservoir, and motor ports for connection with the respective fluid motors; said housing having at least two bores intersected axially therealong by a bypass passage from said inlet port to said return port, by pressure feed passages communicating with said inlet port via an inlet trunk passage and cross bores in said housing, by motor passages communicating with the respective motor ports, and by return passages communicating with said return port; valve spools reciprocable in the respective bores from a neutral position whereat said bypass passage is open for flow of fluid from said inlet port to said return port and communication between said motor passages with said pressure feed passages and return passages is blocked to at least two operating positions whereat said motor passages are selectively communicated with said pressure feed passages or said return passages for actuation of the respective fluid motors, said spools being operative to close said bypass passage upon movement thereof to an operating position for build-up of fluid pressure in said inlet port, inlet trunk passage, and cross bores to supply fluid under pressure to any motor passage then in communication with its associated pressure feed passage; and sleeve means in said cross bores isolating said inlet trunk passage from the bypass passages which also intersect said cross bores.

18. The valve claim 17 wherein load check valve means seating against said sleeve means in at least one cross bore are opened by fluid pressure in said trunk passage and said one cross bore for flow of fluid to a pressure feed passage then in communication with its associated motor passage.

19. The valve of claim 18 wherein overload relief valve means are disposed in said one cross bore to relieve excess pressure in a motor intersecting said one cross bore to a return passage also intersecting said one cross bore.

20. A multi-spool directional control valve for controlling actuation of a corresponding number of fluid motors comprising a housing having an inlet port for connection with a fluid pressure source, a return port for connection with a fluid reservoir, and motor ports for connection with the respective fluid motors; said housing having at least two bores intersected axially therealong by a bypass passage from said inlet port to said return port, by pressure feed passages communicating with said inlet port via an inlet trunk passage and cross bores in said housing, by motor passages communicating with the respective motor ports, and by return passages communicating with said return port; valve spools reciprocable in the respective bores from a neutral position whereat said bypass passage is open for flow of fluid from said inlet port to said return port and communication between said motor passages with said pressure feed passages and return passages is blocked to at least two operating positions whereat said motor passages are selectively communicated with said pressure feed passages or said return passages for actuation of the respective fluid motors; said spools being operative to close said by pass passage upon movement thereof to an operating position for build-up of fluid pressure in said inlet port, inlet trunk passage, and cross bores to supply fluid under pressure to any motor passage then in communication with its associated pressure feed passage; a flow control valve in said housing including a tubular member in said return port constituting a portion of said bypass passage, and a valve member actuated by fluid pressure in said inlet port to establish return flow from any motor passage then in communication with its return passage to said return port when either spool is in an operating position closing said bypass passage; said housing having another cross bore intersecting said inlet trunk passage and communicating with said return passages; check valve means in said last-mentioned another cross bore permitting fluid flow from said return passage into said inlet trunk passage via said check valve means when fluid pressure in said return passages exceeds that in said inlet port as occasioned, for example, by fluid demand of a motor exceeding the capacity of the pressure source; relief-check valve means in at least one of said first-mentioned cross bores which, in conjunction with a four-way spool, is operative to relieve excess fluid pressure in one motor passage through said relief valve means for flow through said check valve means to the other motor passage as occasioned by the inertia of a load on the associated double acting fluid motor when said four-way spool is shifted from operating position to neutral position.

References Cited by the Examiner
UNITED STATES PATENTS

| | | | |
|---|---|---|---|
| 2,527,943 | 10/1950 | Lee | 91—414 X |
| 2,608,824 | 9/1952 | Kirkham | 60—52 |
| 2,945,351 | 7/1960 | Westveer | 60—52 |

SAMUEL LEVINE, *Primary Examiner.*